(12) United States Patent
Patel et al.

(10) Patent No.: US 10,954,892 B2
(45) Date of Patent: Mar. 23, 2021

(54) LIQUID PROPELLANT ROCKET ENGINE NOZZLE WITH PASSIVE CONDENSATE COOLING

(71) Applicant: AEROJET ROCKETDYNE, INC., Sacramento, CA (US)

(72) Inventors: Jiten R. Patel, Jupiter, FL (US); Jim A. Clark, Jupiter, FL (US); Charles Whipple, IV, Okeechobee, FL (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 218 days.

(21) Appl. No.: 16/302,159

(22) PCT Filed: Jun. 15, 2017

(86) PCT No.: PCT/US2017/037657
§ 371 (c)(1),
(2) Date: Nov. 16, 2018

(87) PCT Pub. No.: WO2017/222908
PCT Pub. Date: Dec. 28, 2017

(65) Prior Publication Data
US 2019/0145350 A1 May 16, 2019

Related U.S. Application Data

(60) Provisional application No. 62/352,909, filed on Jun. 21, 2016.

(51) Int. Cl.
*F02K 9/97* (2006.01)
*F02K 9/64* (2006.01)
(Continued)

(52) U.S. Cl.
CPC .............. *F02K 9/972* (2013.01); *B64G 1/401* (2013.01); *F02K 9/62* (2013.01); *F02K 9/64* (2013.01);
(Continued)

(58) Field of Classification Search
CPC ... B64G 1/401; F02K 9/62; F02K 9/64; F02K 9/90; F02K 9/97; F02K 9/972
See application file for complete search history.

(56) References Cited

U.S. PATENT DOCUMENTS 5,582,000 A   12/1996  Rannie et al.
5,683,033 A * 11/1997  Thayer ............... F02K 9/82
                                              239/265.17
(Continued)

FOREIGN PATENT DOCUMENTS

WO   2015055924   4/2015

OTHER PUBLICATIONS

Benson, Tom, Liquid Rocket Engine, Jan. 13, 2005, NASA (Year: 2005).*

(Continued)

*Primary Examiner* — Todd E Manahan
*Assistant Examiner* — Kyle Robert Thomas

(57) ABSTRACT

A liquid propellant rocket engine includes a combustion chamber that has a throat and a nozzle aft of the throat. The nozzle has a first nozzle section adjacent the throat and a second nozzle section aft of the first nozzle section. The first nozzle section includes active cooling features and the second nozzle section excludes any active cooling features. The first nozzle section is operative via at least the active cooling features to form a condensate that passively cools the second nozzle section.

8 Claims, 3 Drawing Sheets

(51) Int. Cl.
  *F02K 9/90* (2006.01)
  *B64G 1/40* (2006.01)
  *F02K 9/62* (2006.01)

(52) U.S. Cl.
  CPC .................. *F02K 9/90* (2013.01); *F02K 9/97* (2013.01); *F05D 2230/31* (2013.01); *F05D 2240/12* (2013.01); *F05D 2240/128* (2013.01); *F05D 2260/20* (2013.01); *F05D 2260/205* (2013.01); *F05D 2300/603* (2013.01)

(56) References Cited

U.S. PATENT DOCUMENTS

| | | | |
|---|---|---|---|
| 6,308,514 B2* | 10/2001 | Haggander | F02K 9/97 60/204 |
| 6,691,948 B1* | 2/2004 | Kim | F02K 9/90 244/3.22 |
| 6,817,184 B2* | 11/2004 | Groeber | F02K 9/976 239/265.11 |
| 8,997,496 B2* | 4/2015 | Pelletier | F02K 9/97 60/770 |
| 2001/0003244 A1* | 6/2001 | Haggander | F02K 9/97 60/770 |
| 2003/0136128 A1* | 7/2003 | Groeber | F02K 9/97 60/771 |
| 2012/0090292 A1 | 4/2012 | Cornu | |

OTHER PUBLICATIONS

International Search Report for International Patent Application No. PCT/US2017/037657 completed Aug. 28, 2017.

International Preliminary Report on Patentability for International Application No. PCT/US2017/037657 dated Dec. 25, 2018.

\* cited by examiner

LIQUID PROPELLANT ROCKET ENGINE NOZZLE WITH PASSIVE CONDENSATE COOLING

CROSS-REFERENCE TO RELATED APPLICATIONS

The present disclosure claims priority to U.S. Provisional Patent Application No. 62/352,909, filed Jun. 21, 2016.

BACKGROUND

Most liquid-propellant rocket engines utilize a fuel (e.g., liquid hydrogen) and an oxidizer (e.g., liquid oxygen). The propellant or propellants are pumped into a combustion chamber and burn to generate a high-temperature, high-pressure, and high-velocity gas stream. The gas stream flows through a throat that accelerates the flow before exiting the engine through a nozzle. The propellants may be cryogenic liquids and may be circulated through the walls of the nozzle to cool the nozzle prior to injection into the combustion chamber.

SUMMARY

A liquid propellant rocket engine according to an example of the present disclosure includes a combustion chamber including a throat and a nozzle aft of the throat. The nozzle has a first nozzle section adjacent the throat and a second nozzle section aft of the first nozzle section. The first nozzle section has active cooling features and the second nozzle section excludes any active cooling features. The first nozzle section is optimized via at least the active cooling features to form a condensate that passively cools the second nozzle section.

In a further embodiment of any of the foregoing embodiments, the active cooling features include internal passages in the first nozzle section.

In a further embodiment of any of the foregoing embodiments, the first nozzle section is metallic and the second nozzle section is non-metallic.

In a further embodiment of any of the foregoing embodiments, the second nozzle section is a carbon fiber reinforced polymer matrix composite.

In a further embodiment of any of the foregoing embodiments, the first nozzle section has an exit defining an area $A1$ and the throat defines an area $A2$, and a ratio $A1/A2$ is less than or equal to 10.

In a further embodiment of any of the foregoing embodiments, the first nozzle section has an exit defining an area $A1$ and the throat defines an area $A2$, and a ratio $A1/A2$ is less than or equal to 8.

A further embodiment of any of the foregoing embodiments includes circumferentially-spaced flow guides on the exit end of the first nozzle section.

In a further embodiment of any of the foregoing embodiments, the circumferentially-spaced flow guides are axially elongated with respect to a central axis of the nozzle and have a height that is equal to or less than about 0.2 inches.

In a further embodiment of any of the foregoing embodiments, the circumferentially-spaced flow guides are ribs that protrude from the first nozzle section.

In a further embodiment of any of the foregoing embodiments, the circumferentially-spaced flow guides are straight.

A liquid propellant rocket engine according to an example of the present disclosure includes a combustion chamber that has a throat. The combustion chamber is operable to expel combustion products from the throat. A nozzle aft of the throat includes a metallic nozzle section adjacent the throat and a non-metallic nozzle section at an exit of the metallic nozzle section. The combustion products have a design temperature at the exit of the metallic nozzle section which exceeds a temperature limit of the non-metallic nozzle section. The metallic nozzle section includes internal cooling passages operative to form water condensate from the combustion products. The water condensate contacting the non-metallic nozzle section to maintain the non-metallic nozzle section below the temperature limit.

In a further embodiment of any of the foregoing embodiments, the exit of the metallic nozzle defines an area $A1$ and the throat defines an area $A2$, and a ratio $A1/A2$ is less than or equal to 10.

In a further embodiment of any of the foregoing embodiments, the non-metallic nozzle section is a polymer matrix composite.

A further embodiment of any of the foregoing embodiments includes circumferentially-spaced flow guides on the metallic nozzle section.

In a further embodiment of any of the foregoing embodiments, the circumferentially-spaced flow guides are ribs that protrude from the metallic nozzle section.

In a further embodiment of any of the foregoing embodiments, the circumferentially-spaced flow guides are axially elongated with respect to a central axis of the nozzle and have a height that is equal to or less than about 0.2 inches.

In a further embodiment of any of the foregoing embodiments, the circumferentially-spaced flow guides are straight.

In a further embodiment of any of the foregoing embodiments, the first nozzle section has an exit defining an area $A1$ and the throat defines an area $A2$, and a ratio $A1/A2$ is less than or equal to 8.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
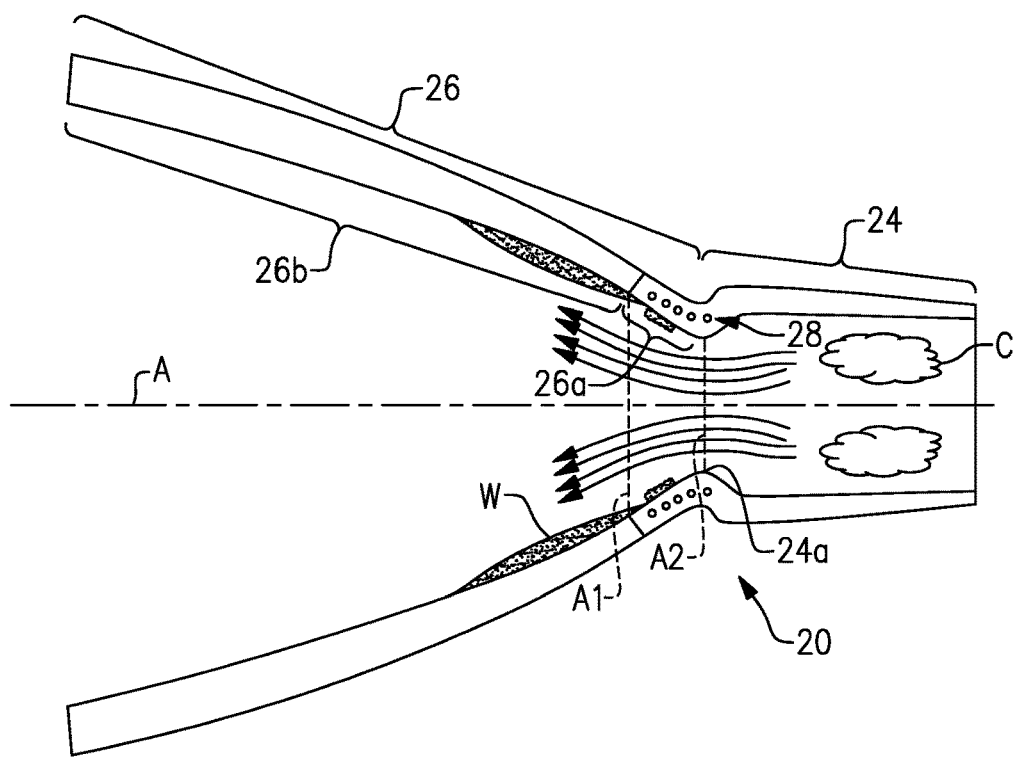
FIG. 1 illustrates an example liquid propellant rocket engine.

FIG. 1 schematically illustrates an example liquid propellant rocket engine 20 ("engine 20"). As will be appreciated, there are many different types of liquid propellant engines to which this disclosure may apply. In this regard, although not shown, the engine 20 will typically have plumbing for conveying the propellant(s) and various pumps and valves for controlling propellant delivery. As will be described below, the engine 20 is configured with a passive cooling scheme, which may allow for use of lighter and/or stronger materials in areas that were previously too hot for such materials.

The engine 20 is disposed about central axis A and includes a combustion chamber 24. The combustion chamber 24 includes a throat 24a, which is the location of the minimum cross-sectional area of the combustion chamber 24. The engine 20 includes a nozzle 26 aft of the throat 24a. The nozzle 26 includes a first nozzle section 26a immediately adjacent the throat 24a and a second nozzle section 26b immediately aft of the first nozzle section 26a. The second nozzle section 26b most typically is a separate and distinct piece from the first nozzle section 26a. In one example, the first nozzle section 26a is formed of a metal or metal alloy, such as copper alloy, and the second nozzle section 26b is formed of a non-metallic material such as graphite or polymer matrix composite. In another example, the second nozzle section 26b is formed of a metallic material such as Inconel or columbium.

The first nozzle section 26a includes regenerative or active cooling features, schematically depicted at 28, and the second nozzle section 26b excludes any active cooling features. The throat 24a and combustion chamber 24 may also include the active cooling features 28. Active cooling features are those that consume energy to provide cooling. An example active cooling feature may be, but is not limited to, a coolant circuit in which a pump, and typically valves, are powered to move coolant to and from a source of heat.

The first nozzle section 26a is optimized via at least the active cooling features 28 to form a water condensate that passively cools the second nozzle section 26b. For example, fuel and oxidant are burned in the combustion chamber 24, as represented at C, and form steam as a product of combustion. The hot steam is expanded from the throat 24a through the nozzle 26. Steam that flows adjacent to the sides of the first nozzle section 26a may condense via the cooling provided by the active cooling features 28 and form water condensate, represented at W. The water condensate may then travel downstream to the second nozzle section 26b in a film along the interior of the nozzle 26. The water condensate evaporates from the second nozzle section 26b, as represented at E, thereby contributing to the passive cooling of the second nozzle section 26b.

In some examples, the nozzle 26 may be configured such that the second nozzle section 26b is axially longer than the first nozzle section 26a. That is, a small portion of the nozzle 26 includes active cooling and at least the hottest, forward end of the remaining portion of the nozzle is passively cooled for thermal protection. The design of the active cooling features 28 is optimized based on the operating environment within the nozzle 26 (e.g., temperature, pressure, mass flow of the steam, etc.), the nozzle material, the nozzle thickness, the nozzle dimensions, and operational duration to promote formation of water condensation. In some examples, the passive cooling enables the second nozzle section 26b to be non-metallic, such as a carbon/graphite-based material or a carbon reinforced polymer matrix composite. In other examples, the passive cooling enables the second nozzle section 26b to be metallic, such as Inconel or columbium. Without optimization of water-condensate cooling, this location near the throat 24a would exceed temperature limits for such materials and thus rapidly char and/or degrade.

The passive cooling may also permit the second nozzle section materials to be used at lower-area-ratio sections of the nozzle 26. The area ratio of the engine 20 is the ratio of the local cross-sectional area of nozzle 26 shown at A1, to the cross-sectional area of the plane of the throat 24a, depicted at A2. In one example, the area ratio A1/A2 is less than or equal to 10. In a further example, the area ratio A1/A2 is less than or equal to 8. At such locations and area ratios, thermal challenges typically preclude carbon and polymer and other passively cooled materials. However, the passive cooling herein facilitates lower temperatures at the forward end of the second nozzle section 26b and may thereby permit use of carbon and polymer as well as high-temperature-capability metals. In this example, optimization of the active cooling features 28 are the conditions at which cooling is such that a material that would otherwise char or degrade at an area ratio of 10 or less can be used at that area ratio without rapidly charring and/or degrading.

Figure 2:
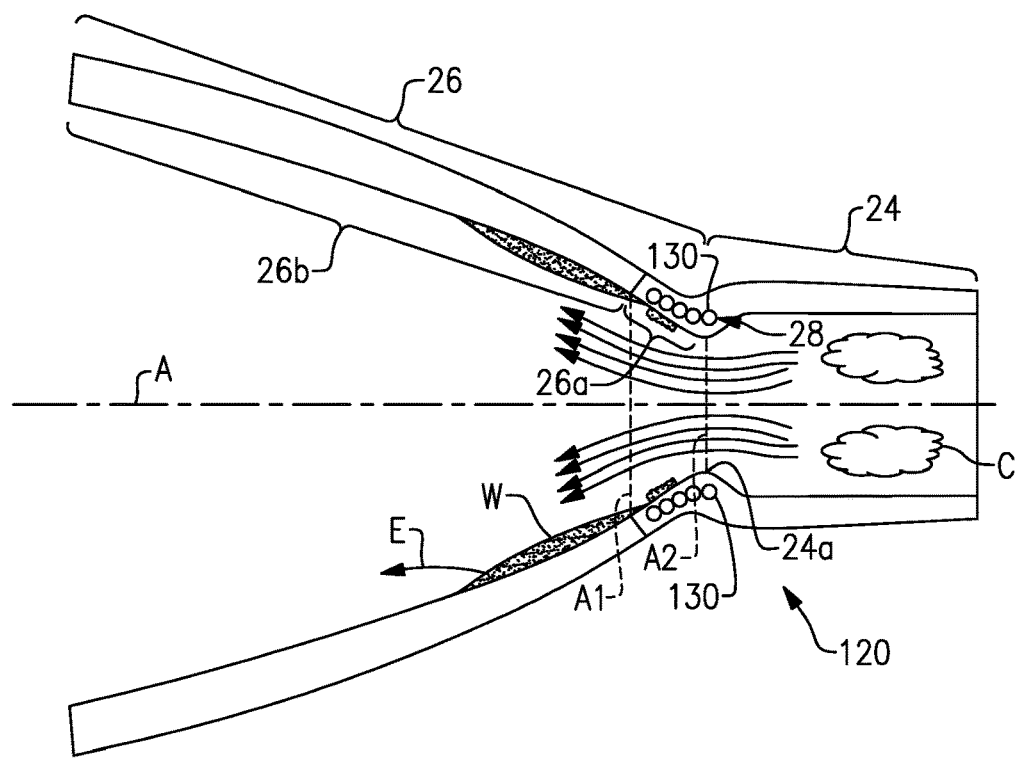
FIG. 2 illustrates another example liquid propellant rocket engine with internal cooling passages.

FIG. 2 illustrates another example engine 120. In this disclosure, like reference numerals designate like elements where appropriate and reference numerals with the addition of one-hundred or multiples thereof designate modified elements that are understood to incorporate the same features and benefits of the corresponding elements. Here, the engine 120 is similar to the engine 20 but the active cooling features 28 of the engine 120 include internal passages 130. For example, although not limited, the internal passages 130 may be formed by tubes that are situated side-by-side around the central axis or by integrated passages formed by additive manufacturing techniques. The internal passages 130 are in the first nozzle section 26a, while the second nozzle section 26b does not contain any such passages or other active cooling features.

Figure 3:
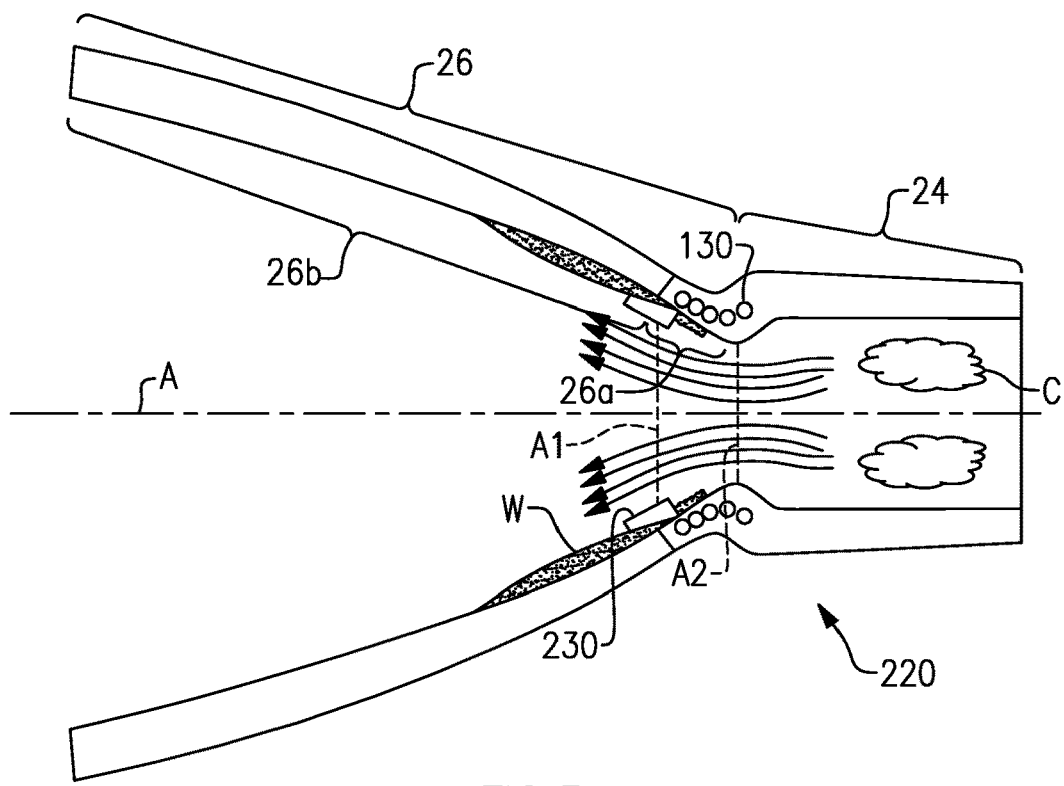
FIG. 3 illustrates another example liquid propellant rocket engine with circumferentially-spaced flow guides.
Figure 4A:
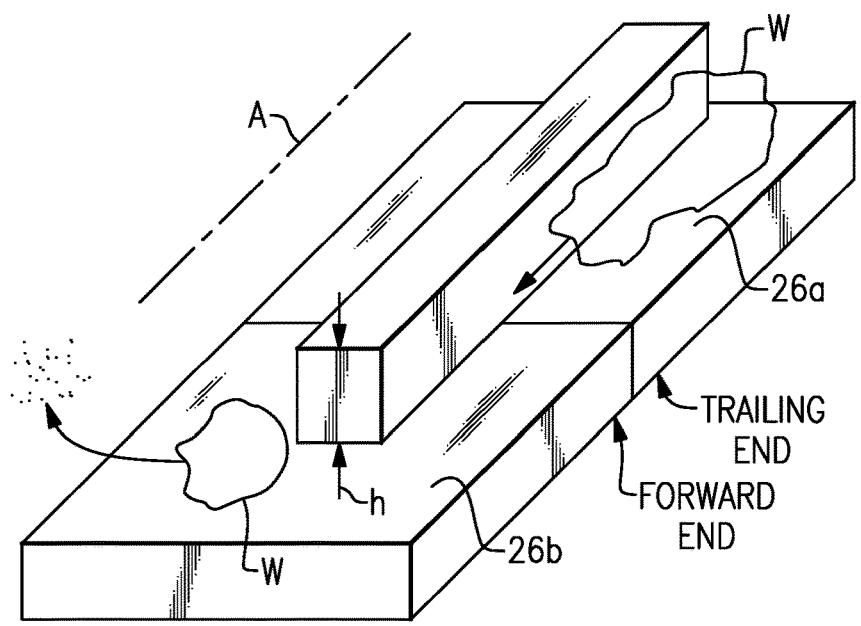
FIG. 4A is a view of a representative one of the flow guides.
Figure 4B:
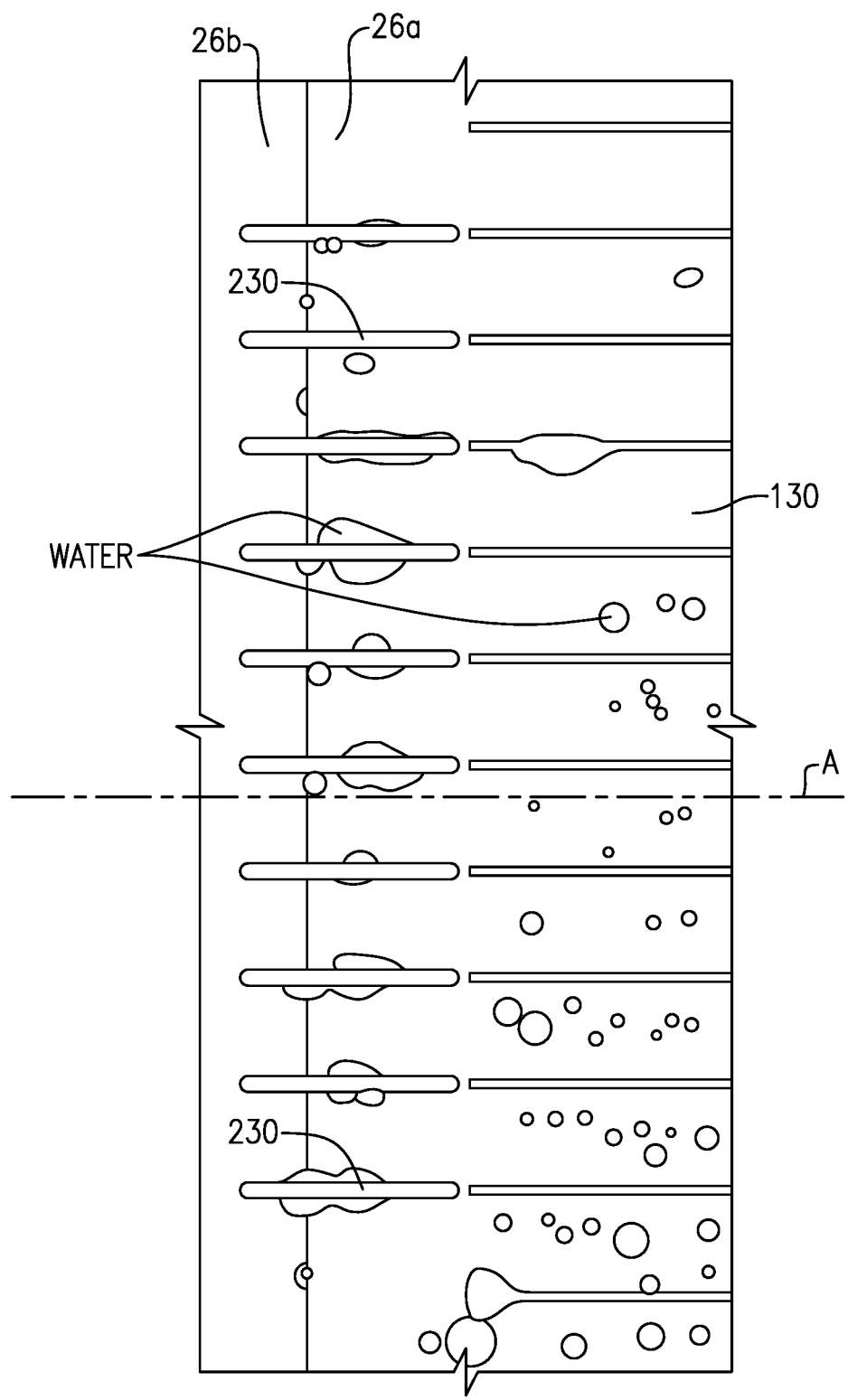
FIG. 4B illustrates multiple flow guides on a trailing end of a first nozzle section.

FIG. 3 illustrates another example engine 220. The engine 220 is similar to the engine 120 but additionally includes circumferentially-spaced flow guides 230 on the first nozzle section 26a, which are also shown in closer views in FIGS. 4A and 4B. The flow guides 230 are uniformly spaced around the circumference of the trailing end of the first nozzle section 26a. In this example, the circumferentially-spaced flow guides 230 are ribs that radially protrude from the first nozzle section 26a and may aftly project from the trailing end of the first nozzle section 26a, beyond the exit plane of the trailing end. The extension beyond the exit plane facilitates guidance of the water condensate to the second nozzle section 26b. In one example modification, the flow guides 230 may instead end at or near the exit plane of the first nozzle section 26a.

In another alternative, the flow guides 230 could be inset grooves or a combination of grooves and ribs. Here, the ribs are straight and axially elongated with respect to the central axis A of the nozzle 26. In one example, the ribs also have a height (h) that is equal to or less than about 0.1 inches. In another example, the rib height is 0.2 inches. The ribs, with the axial elongation and small height, are low profile to reduce the potential of being burned off in the hot gas stream.

The flow guides 230 may be separately formed and attached to the first nozzle section 26a, such as by welding. Alternatively, the flow guides 230 may be integrally formed with the first nozzle section 26a, such as by additive manufacturing.

The water condensate may, in some cases, not be circumferentially uniform. The non-uniformity may result in temperature gradients in the passively cooled second nozzle section 26b. The flow guides 230 utilize the high surface tension of the water condensate to enhance the circumferential uniformity of the water condensate. The high surface tension causes the water condensate to temporarily attach to the flow guides 230 as the water exits the trailing end of the first nozzle section 26a. The water then drips or flows from flow guides 230 onto the forward end of the second nozzle section 26b. The spacing of the flow guides 230 provides a more uniform water distribution and flowrate onto the hot wall of the second nozzle section 26b. This, in turn, may permit use of even lower temperature materials in the second nozzle section 26a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A liquid propellant rocket engine comprising:
a combustion chamber including a throat, the combustion chamber operable to expel combustion products from the throat; and
a nozzle aft of the throat, the nozzle including a metallic nozzle section adjacent the throat and a non-metallic nozzle section at an exit of the metallic nozzle section, the combustion products having a design temperature at the exit of the metallic nozzle section which exceeds a temperature limit of the non-metallic nozzle section, the metallic nozzle section including internal cooling passages operative to form water condensate from the combustion products, the water condensate contacting the non-metallic nozzle section to maintain the non-metallic nozzle section below the temperature limit.

2. The liquid propellant rocket engine as recited in claim 1, wherein the exit of the metallic nozzle defines an area A1 and the throat defines an area A2, and a ratio A1/A2 is less than or equal to 10.

3. The liquid propellant rocket engine as recited in claim 2, wherein the non-metallic nozzle section is a polymer matrix composite.

4. The liquid propellant rocket engine as recited in claim 3, further comprising circumferentially-spaced flow guides on the metallic nozzle section.

5. The liquid propellant rocket engine as recited in claim 4, wherein the circumferentially-spaced flow guides are ribs that protrude from the metallic nozzle section.

6. The liquid propellant rocket engine as recited in claim 4, wherein the circumferentially-spaced flow guides are axially elongated with respect to a central axis of the nozzle and have a height that is equal to or less than about 0.2 inches.

7. The liquid propellant rocket engine as recited in claim 4, wherein the circumferentially-spaced flow guides are straight.

8. The liquid propellant rocket engine as recited in claim 2, wherein the first nozzle section has an exit defining an area A1 and the throat defines an area A2, and a ratio A1/A2 is less than or equal to 8.

* * * * *